United States Patent [19]

Maxwell

[11] 4,208,824
[45] Jun. 24, 1980

[54] FISH LURE

[76] Inventor: James D. Maxwell, P.O. Box 649, Vancouver, Wash. 98660

[21] Appl. No.: 902,923

[22] Filed: May 5, 1978

[51] Int. Cl.² ............................................. A01K 85/00
[52] U.S. Cl. .................................................. 43/42.19
[58] Field of Search ............... 43/42.14, 42.16, 42.17, 43/42.19, 42.2, 42.21

[56] References Cited

U.S. PATENT DOCUMENTS

| D. 175,099 | 7/1955 | Bahr | 43/42.19 |
|---|---|---|---|
| 648,360 | 4/1900 | Pflueger | 43/42.19 |
| 2,621,437 | 12/1952 | Pedranti | 43/42.19 |
| 3,226,875 | 1/1966 | Woolums | 43/42.17 |
| 3,555,717 | 1/1971 | Gautsche | 43/42.17 |

FOREIGN PATENT DOCUMENTS 1325793   3/1962   France .................................... 43/42.17

*Primary Examiner*—Nicholas P. Godici
*Attorney, Agent, or Firm*—Eugene M. Eckelman

[57] ABSTRACT

A U-shaped connector has apertures adjacent the ends of its arms which receive a shaft of a fishing lure. The connector has a spinner blade attached thereto, and this blade is rotatable with the connector around the shaft during trolling or other moving functions of the lure. A rotatable spherical bead is mounted on the shaft between the arms of the connector to hold the ends of the arms a selected spaced distance apart. In addition, rotatable spherical bead means are mounted on the shaft one on each side of the connector arms.

2 Claims, 4 Drawing Figures

FISH LURE

BACKGROUND OF THE INVENTION

This invention relates to new and useful improvements in fishing lures and particularly pertains to a lure of the type having a rotating spinner blade or the like thereon.

Rotating spinner blades for fish lures are well known. The spinner blades are generally connected to a shaft of the lure by means of a U-shaped or clevis-shaped connector which rotates around the shaft with the blade when the lure is trolled. In any distortion of the connector caused by the rotating blade the arms of the connector not only twist somewhat but they also spring toward each other which obviously makes them bind on the shaft. This distortion creates undesirable friction between the connector and the shaft with the disadvantage that the lure itself will tend to rotate with the spinner blade and twist the fish line. In addition to causing such undesirable rotation of the entire lure, the distortion of the connector causes it to cut into the shaft and into itself at its apertures and produce substantially fast wear.

SUMMARY OF THE INVENTION

According to the present invention and forming a primary objective thereof a fish lure is provided wherein the connector for a spinner blade has free rotation on the shaft of the lure in all phases of operation of the lure, thus preventing the lure itself from rotating and thus resulting in little or no twisting of the fish line.

To carry out the above objectives, a U-shaped connector is used in combination with a first spherical bead rotatably supported on the shaft of the lure between the arms of the connector to maintain the arms in selected spaced apart relation. Further, second and third spherical beads are rotatably supported on the shaft one on each side of the arms in cooperation with the connector and with abutment means of the lure to maintain free rotation of the connector and spinner blade.

The invention will be better understood and additional objects and advantages will become apparent from the following description taken in connection with the accompanying drawings which illustrate a preferred form of the invention.

DETAILED DESCRIPTION OF A PREFERRED EMBODIMENT

Figure 1:
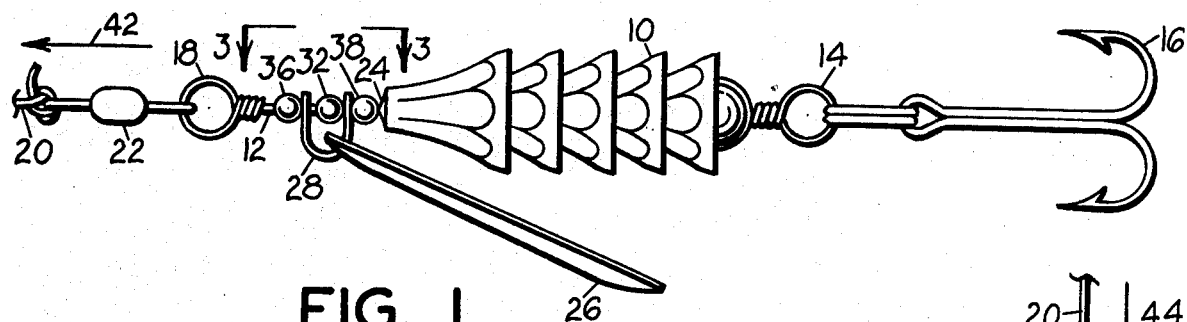
FIG. 1 is an elevational view of a fish lure embodying the instant invention and showing one phase of operation of the lure.
Figure 2:
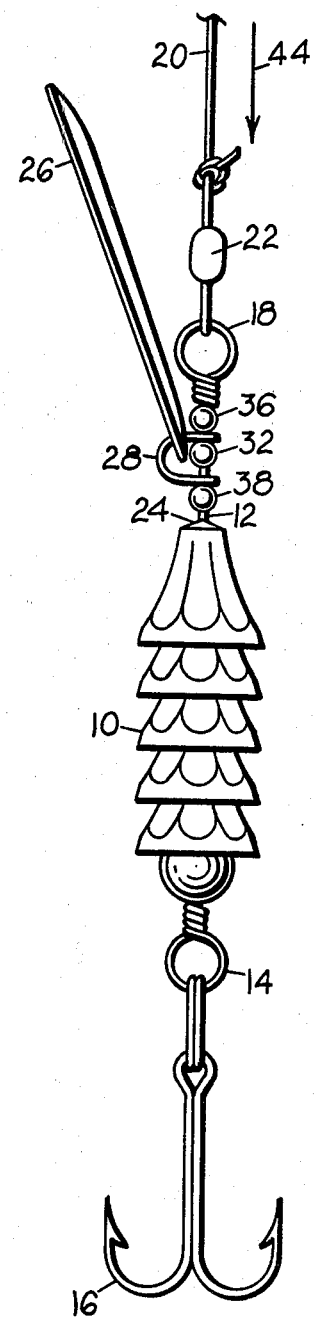
FIG. 2 is a view similar to FIG. 1 but showing the lure in another phase of operation.

With particular reference to the drawings and first to FIGS. 1 and 2, the invention is shown as being associated with a conventional lure comprising a body member 10 mounted on a shaft 12 which generally comprises a substantially stiff wire. One end of the shaft has an eye 14 for connection to the fish hook 16 and the other end of the shaft has an eye 18 for connection to a fish line 20. One or more swivel assemblies 22 may be associated with the fish lure. Body member 10 is of conventional design but for the purpose of the instant invention it is necessary that it have an abutment end 24. In this same regard, it is necessary that the eye 18 be formed in spaced relation from the abutment end 24 of the body member and as will be more apparent hereinafter, a wrapped portion of the eye serves as an abutment.

Figure 4:
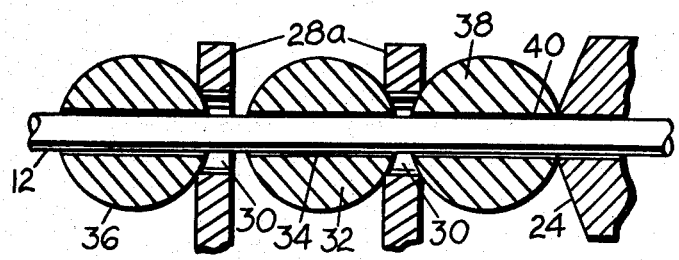
FIG. 4 is a sectional view taken on the line 4—4 of FIG. 3.

A spinner blade 26 of known design has an aperture in one end for rather loose attachment to a U-shaped connector 28 having a pair of arms 28a with apertures 30, FIG. 4, adjacent their free ends which receive the shaft 12 in a freely rotating relation.

The general structure of the lure and spinner blade as thus far described is known, and the present invention is concerned with the detailed construction of the connector 28 and associated parts as will now be described.

Figure 3:
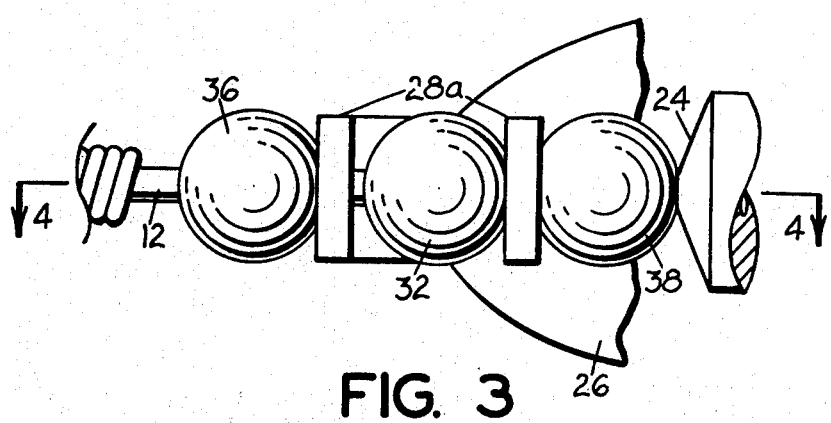
FIG. 3 is an enlarged fragmentary plan view taken on the line 3—3 of FIG. 1.

With particular reference to FIGS. 3 and 4, a spherical bead 32 is mounted on the shaft 12 between the arms 28a of the connector. This bead has an axial opening 34 which freely receives the shaft so that said bead is rotatable and slidable on the shaft. The diameter of this bead is slightly less than the spacing between the arms 28a to allow for its rotation. One function of the spherical bead 32 is to prevent the arms 28a from moving together any substantial distance or at least a distance which would allow the arms to bind on the shaft 12. The bead 32 maintains the arms 28a in substantially parallel relation thus keeping them from being sprung together.

Also mounted on the shaft are two more spherical beads 36 and 38, these two beads being located on opposite or the outer sides of the respective arms 28a. These two beads, like bead 32, have an axial opening 40 which allows them to be freely rotatable and slidable on the shaft 12. For a reason which will now become apparent, the apertures 30 in the arms 28a are made substantially larger than the diameter of the shaft.

The connector 28 and its assembly are disposed between the abutment end 24 of the body member 10 of the lure and the eye 18 and are disposed between such abutments for free rotatable movement and a very small slidable distance. When the lure is being trolled, namely, in the direction of arrow 42 in FIG. 1, the water pressure against the spherical beads 32, 36 and 38 as well as against the connector 28 and spinner blade 26 will move the connector assembly into engagement with the abutment end 24 of the body member 10. This clamps the one arm 28a between beads 32 and 38, FIG. 4. Bead 36 engages against the forward side of the other arm 28a. This beaded engagement and spacing of the connector assembly on the shaft holds the arms 28a substantially parallel and also such arms are maintained substantially at right angles to the shaft. The result is that the connector and its spinner blade have free rotation without any substantial binding or other friction. The lure itself thus will travel through the water without rotation of its shaft and possible twisting of the line.

In addition, and as best seen in FIG. 4, beads 32 and 38 abut against the one arm 28a at the enlarged opening 30, and by the rounded inwardly projecting of a peripheral portion thereof into such opening, these beads suspend the arm off the shaft. The arm 28a itself thus does not have any metal to metal contact with the shaft 12. In addition, the water pressure against the bead 36 similarly pushes this bead partway into the aperture 30 of the other arm 28a and likewise suspends this arm off the shaft.

In accordance with the invention there is provided a support for a spinning blade connector on a shaft which provides for an extremely free rotation. This is accomplished not only by using beads to maintain the arms 28a in substantially parallel relation and to support the arms 28a away from metal to metal contact with the shaft 12, but to provide pressured engagement on the arms 28a by the beads as a result of water pressure on the beads to maintain the arms substantially at right angles to the shaft 12.

FIG. 2 is a view similar to FIG. 1 except that the lure is moving in the opposite direction, namely, in the direction of arrow 44. This operation of the lure occurs when it is being lowered into the water just prior to trolling or retrieving, wherein the spinner blade 26 is directed away from the hook. In this operation, the function of the parts is identical to that shown in the other Figures except that the connector 28 abuts against eye 18 and the spherical beads 32 and 36 operate on the arm of the connector the same as the beads 32 and 38 did during travel of the lure in the opposite direction which was shown in detail in FIG. 4. Bead 38 acts on the other arm 28a as bead 36 did in FIG. 4. In this phase of operation, the blade 26 similarly rotates very freely. This method of mounting the blade 26 on the lure insures that the spinner blade will rotate when the lure is being lowered in the water. Such adds to the fishing capability of the lure since fish are often attracted by the spinning of the blade 26 when the lure is being lowered prior to trolling or retrieving.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:
1. A fish lure comprising
 (a) a shaft having opposite ends,
 (b) one of said ends having means for a connection to a hook and the other end having means for connection to a fish line,
 (c) a connector having a pair of parallel arms and a connecting end at one end of said arms forming a U-shape,
 (d) said arms having a free end provided with apertures arranged to receive said shaft and arranged to support said connector at right angles to the shaft,
 (e) a spinner blade on said connector arranged for rotation around said shaft with said connector,
 (f) a first spherical bead rotatably supported on said shaft between said arms and arranged to hold the free end of said arms spaced a selected distance apart regardless of twisting forces from said spinner blade,
 (g) second and third spherical beads rotatably supported on said shaft,
 (h) and abutment means on said shaft on opposite sides of said connector,
 (i) said second and third beads being disposed on respective opposite sides of said arms from said bead between said arms and said abutment means,
 (j) said apertures in said connector arms being larger than the diameter of said shaft but smaller than the diameter of said beads,
 (k) the enlargement of said apertures being of such diameter as to receive a peripheral portion of said first bead from one side of one of said connector arms and to receive a peripheral portion of said second or third beads from the other side of said connector arm whereby upon pressured engagement of the pair of beads on opposite sides of said arm, said arm is supported on said pair of beads for rotation in suspended relation out of engagement with said shaft.

2. The fish lure of claim 1 wherein the bead other than the pair of beads that have pressured engagement on opposite sides of one of said arms also has a peripheral portion thereof received in said aperture in the other arm so as also to support said arm in suspended relation out of engagement with said shaft.

* * * * *